United States Patent
Hotta et al.

(10) Patent No.: US 11,128,192 B2
(45) Date of Patent: Sep. 21, 2021

(54) MOTOR WITH GUIDE MEMBER

(71) Applicant: DENSO CORPORATION, Kariya (JP)

(72) Inventors: Koji Hotta, Kariya (JP); Motoki Uehama, Kariya (JP)

(73) Assignee: DENSO CORPORATION, Kariya (JP)

( * ) Notice: Subject to any disclaimer, the term of this patent is extended or adjusted under 35 U.S.C. 154(b) by 75 days.

(21) Appl. No.: 16/426,741

(22) Filed: May 30, 2019

(65) Prior Publication Data

US 2020/0014268 A1 Jan. 9, 2020

(30) Foreign Application Priority Data

Jul. 5, 2018 (JP) .............................. JP2018-128416

(51) Int. Cl.
| | |
|---|---|
| *H02K 3/38* | (2006.01) |
| *H02K 3/52* | (2006.01) |
| *H02K 1/14* | (2006.01) |
| *H02K 3/50* | (2006.01) |
| *H02K 3/28* | (2006.01) |
| *H02K 3/18* | (2006.01) |
| *B60T 13/74* | (2006.01) |

(52) U.S. Cl.
CPC ............... *H02K 3/38* (2013.01); *H02K 1/146* (2013.01); *H02K 3/522* (2013.01); *B60T 13/745* (2013.01)

(58) Field of Classification Search
CPC .......... H02K 3/522; H02K 3/38; H02K 1/146; H02K 2203/09; H02K 3/18; H02K 3/28; H02K 3/50; H01R 9/20
See application file for complete search history.

(56) References Cited

U.S. PATENT DOCUMENTS

| | | | |
|---|---|---|---|
| 2011/0234031 A1 | 9/2011 | Kato | |
| 2013/0187496 A1* | 7/2013 | Creeden | H01R 13/5219 310/71 |
| 2019/0165650 A1* | 5/2019 | Park | B60T 13/74 |
| 2020/0014273 A1* | 1/2020 | Ogawa | H02K 5/1732 |

FOREIGN PATENT DOCUMENTS

| | | |
|---|---|---|
| JP | 2011-205817 A | 10/2011 |
| JP | 2014-187797 A | 10/2014 |

* cited by examiner

*Primary Examiner* — Burton S Mullins
*Assistant Examiner* — Riley Owen Stout
(74) *Attorney, Agent, or Firm* — Oliff PLC

(57) ABSTRACT

A motor includes a stator a rotor, and a guide member. The stator includes a stator core and multiphase coils wound on the stator core. The guide member is arranged on an end of the stator core located at one side in an axial direction to glide a terminal wire of the multiphase coils wound on the stator core. The guide member includes an outlet guide that draws the terminal wire out of the guide member toward a circuit board. The outlet guide includes insertion holes into which the terminal wire is inserted. The insertion holes each include an inlet located toward the stator core and an outlet. The inlet has a larger open area than the outlet.

4 Claims, 16 Drawing Sheets

MOTOR WITH GUIDE MEMBER

BACKGROUND

1. Field

The present disclosure relates to a motor.

2. Description of Related Art

In a typical motor, coils are wound on a stator core of a stator, and terminal wires of the coils are electrically connected (for example, refer to Japanese Laid-Open Patent Publication No. 2011-2058171.

In the stator described in the publication described above, an insulator coupled to the stator core includes grooves extending in a radially outer side of the insulator so that the terminal wires of the coils are laid out. As the terminal wires of the coils are accommodated in the grooves, the coils of each phase are electrically connected.

In a stator such as that described above, for example, when the coils are collected and connected to a circuit board, an insulative tubular guide member may be used to ensure insulation between the coils. For example, the guide member may include through, holes that allow the terminal wires of the coils to be inserted into the guide member and hold the terminal wires. However, if the through holes are very narrow, insertion of the terminal wires may be hindered.

SUMMARY

It is, an object of the present disclosure to provide a motor that allows easy insertion of a terminal wire of a coil.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

To achieve the above object, one aspect of the present disclosure is a motor that includes a stator, a rotor, and a guide member. The stator includes a stator core and multiphase coils wound on the stator core. The rotor is rotated by a rotational magnetic field generated in the stator. The guide member is arranged on an end of the stator core located at one side in an axial direction to guide a terminal wire of the multiphase coils wound on the stator core. The guide member includes an outlet guide that draws the terminal wire out of the guide member toward a circuit board. The outlet guide includes insertion holes into which the terminal wire is inserted. The insertion holes each include an inlet and an outlet. The inlet is located toward the stator core and draws in the terminal wire. The outlet draws out the terminal wire. The inlet has a larger open area than the outlet Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity; illustration, and convenience.

DETAILED DESCRIPTION

Figure 1:
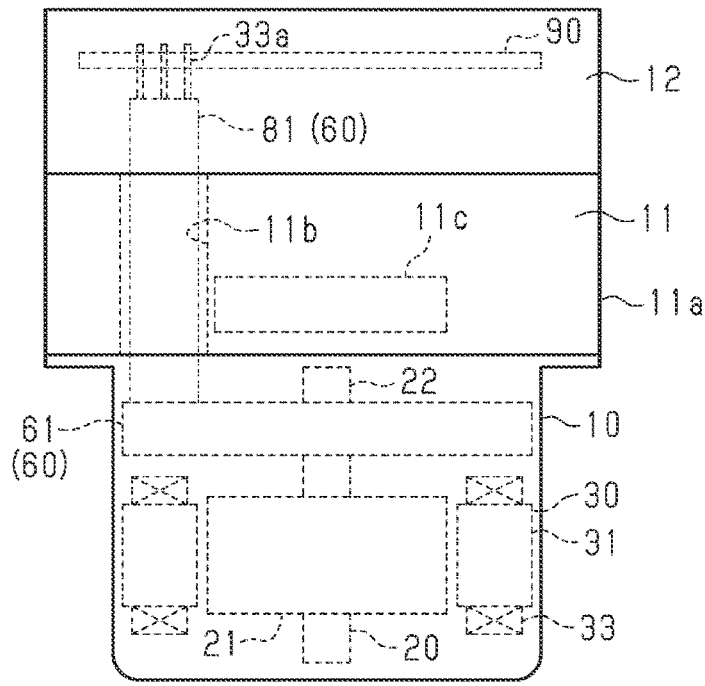
FIG. 1 is a schematic diagram showing one embodiment of a motor.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

One embodiment of a motor including a stator will now be described with reference to the drawings. To facilitate understanding, components may be enlarged or simplified in the drawings. The drawings may not have necessarily been drawn to scale.

As shown in FIG. 1, a motor 10 is used in an electric brake system. The electric brake system includes a hydraulic unit 11 that adjusts the liquid pressure of a brake fluid, the motor 10 connected to the hydraulic unit 11 to drive the hydraulic unit 11, and an electric driver unit 12 (EDU) that controls the driving of the motor 10. In the present example of the brake system, the hydraulic unit 11 is located between the EDU 12 and the motor 10. The motor 10 and the EDU 12 are electrically connected through a through hole 11b that extends in a casing 11a of the hydraulic unit 11.

The motor 10 of the present embodiment includes a rotor 20 and a stator 30.

As shown in FIG. 1, the rotor 20 includes a rotor core 21, magnets (not shown) arranged on the rotor core 21, and a rotary shaft 22 arranged in the center of the rotor core 21 in the radial direction. The rotary shaft 22 has an axial end that is directly or indirectly coupled to a gear 11c arranged in the hydraulic unit 11. When the rotary shaft 22 is driven to rotate, the gear 11c in the hydraulic unit 11 is driven to adjust the liquid pressure of the brake fluid.

Figure 2:
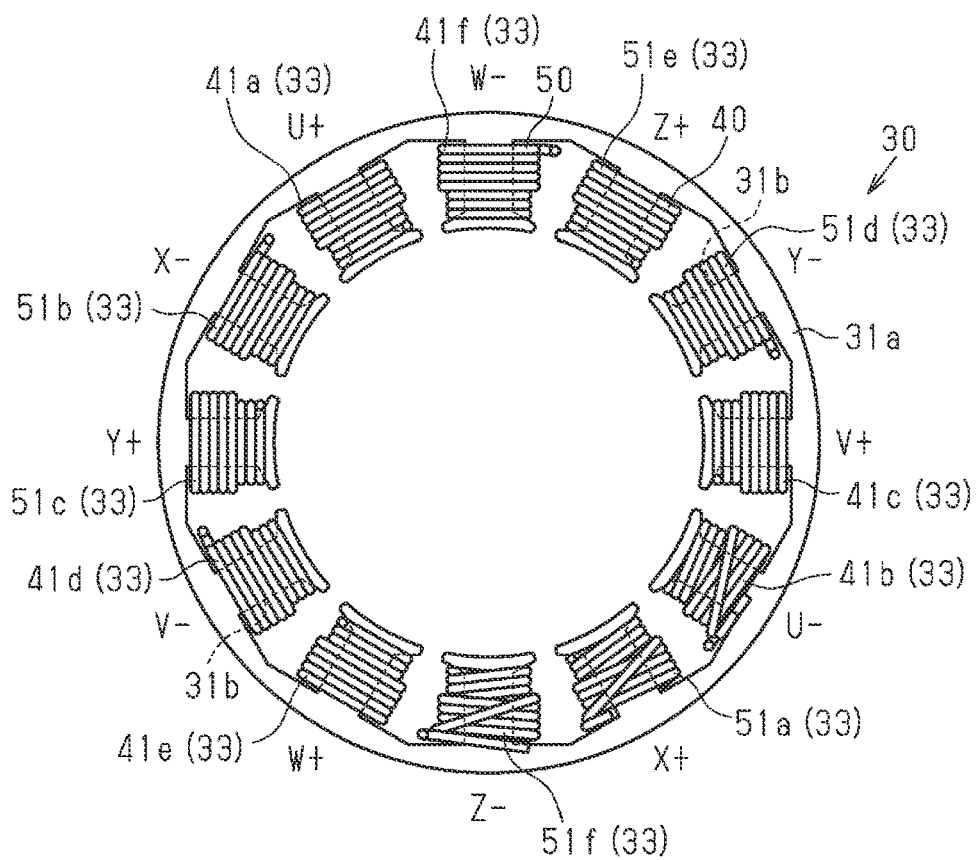
FIG. 2 is a plan view showing a stator of the embodiment from which a guide member is removed.
Figure 3:
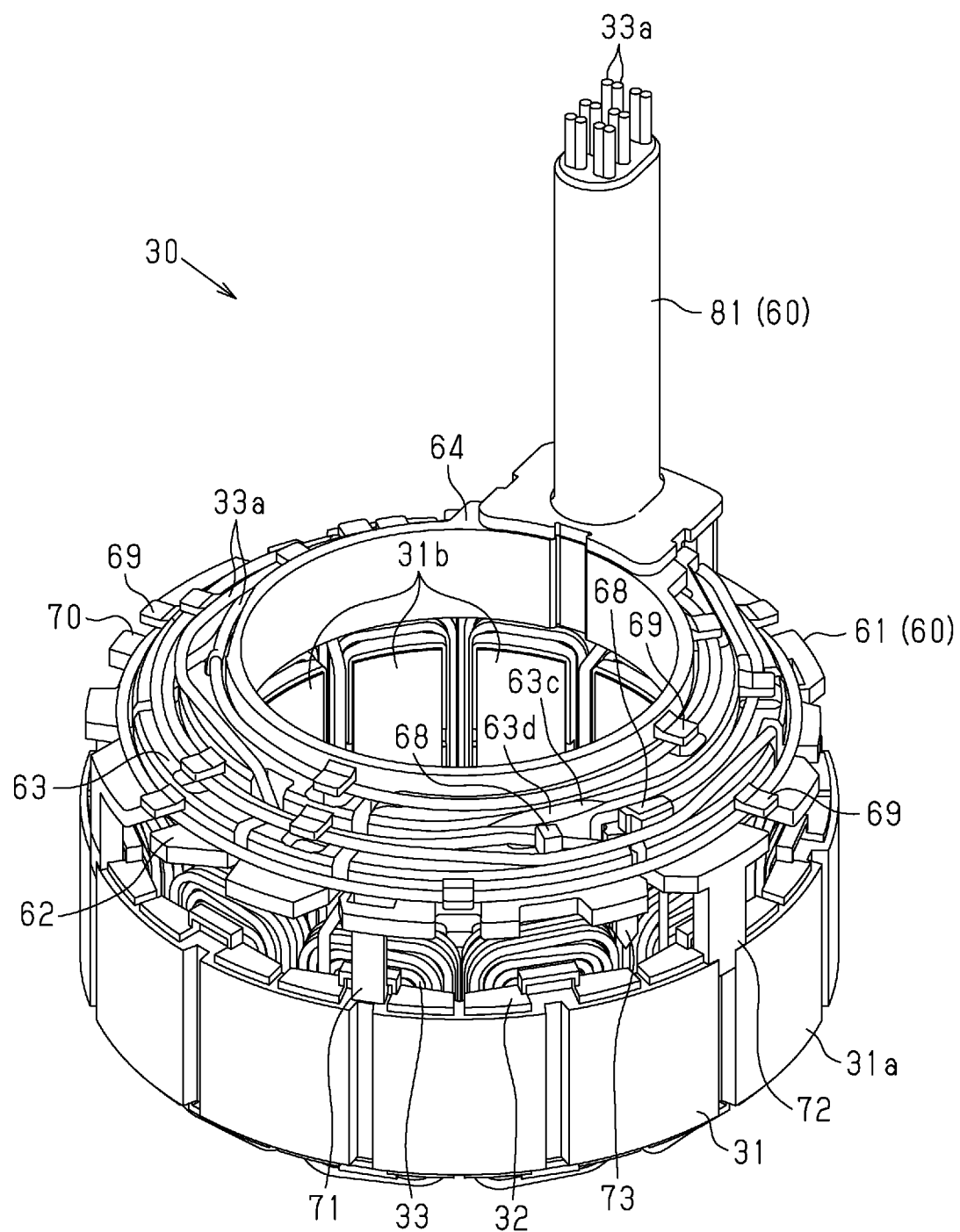
FIG. 3 is a perspective view of the stator of the embodiment.
Figure 4:
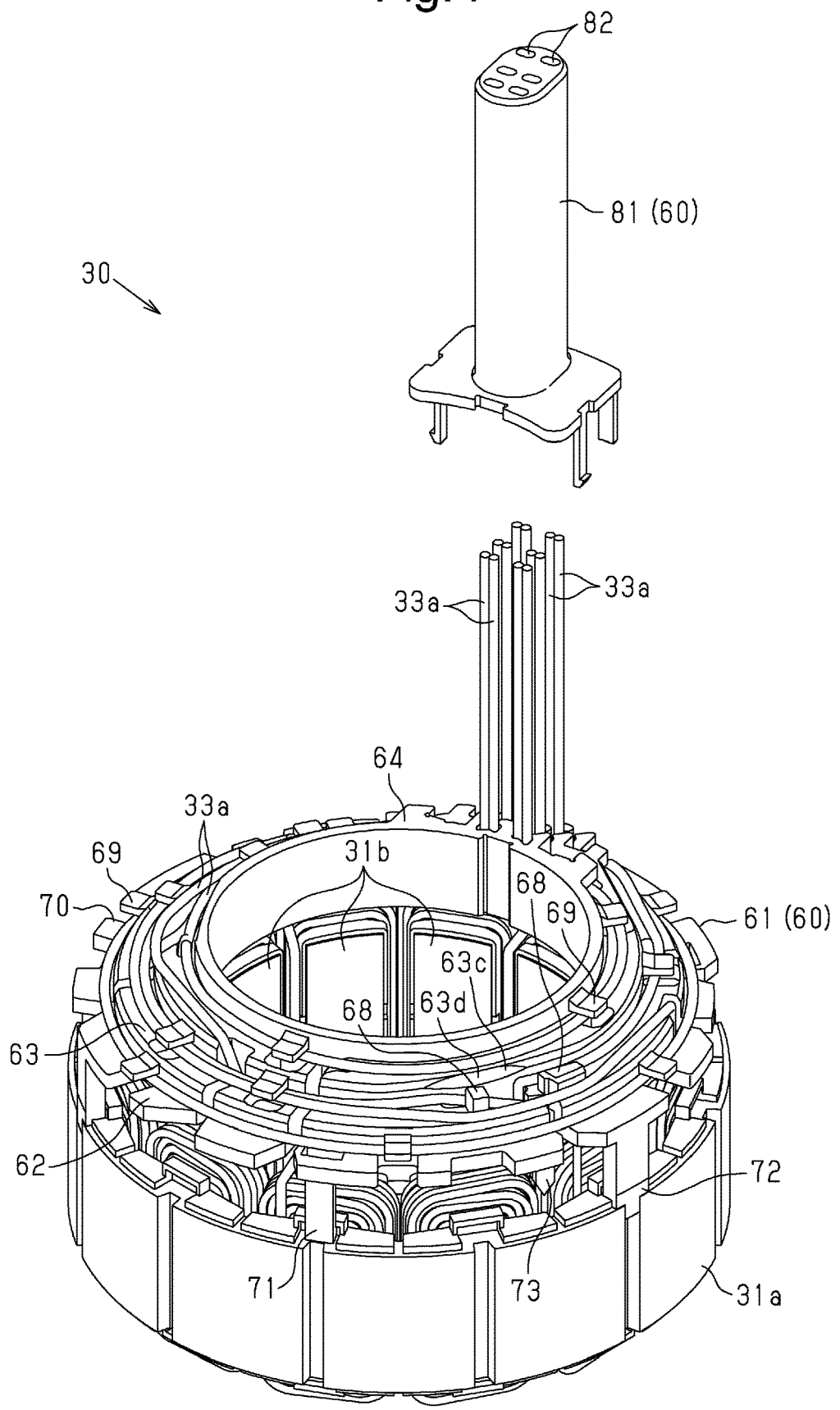
FIG. 4 is an exploded perspective view of the stator of the embodiment.

As shown in FIGS. 2 to 4, the stator 30 includes a stator core 31, an insulator 32 of the stator core 31, and stator coils 33.

The stator core 31 includes a generally circular annular portion 31a and teeth 31b extending radially inward from the annular portion 31a. In the present embodiment, for example, twelve teeth 31b are provided. The stator coils 33 are wound on each of the teeth 31b with the insulator 32 located in between. The stator coils 33 are wound in, for example, a concentrated manner.

The stator coils 33 include a first three-phase winding 40, which is electrically connected to a first inverter circuit (not shown), and a second three-phase winding 50, which is electrically connected to a second inverter circuit (not shown). The first and second inverter circuits are included in a circuit board 90. That is, in the present embodiment, the two inverter circuits are used to supply current to the three-phase windings 40 and 50 and excite the three-phase windings 40 and 50.

As shown in FIG. 2, the first three-phase winding 40 includes three-phase windings 41a to 41f supplied with three-phase alternating currents, the phases of which differ from each other by 120 degrees, from the first inverter circuit. The three-phase windings 41a to 41f include a U+ phase winding 41a, a U-phase winding 41b, a V+ phase winding 41c, a V− phase winding 41d, a W+ phase winding 41e, and a W− phase winding 41f.

As shown in FIG. 2, the second three-phase winding 50 includes three-phase windings 51a to 51f supplied with three-phase alternating currents, the phases of which differ from each other by 120, from the second inverter circuit. The three-phase windings 51a to 51f include a X+ phase winding 51a, a X− phase winding 51b, a Y+ phase winding 51c, a Y− phase winding 51d, Z+ phase winding 51e, and a 2-phase winding 51f.

The different stator coils 33 are wound on each of the teeth 31b. In the present embodiment, the stator coils 33 are wound on the stator 30, for example, in the order of the U+ phase winding 41a, the W-phase winding 41f, the Z+ phase winding 51e, the Y− phase winding 51d, the V+ phase winding 41c, the U− phase winding 41b, the X+ phase winding 51a, the Z− phase winding 51f, the W+ phase winding 41e, the V− phase winding 41d, the Y+ phase winding 51c, and the X− phase winding 51b.

The U+ phase winding 41a and the U− phase winding 41b are wound on the teeth 31b in the same direction. The V+ phase winding 41c and the V− phase winding 41d are wound on the teeth 31b in the same direction. The W+ phase winding 41e and the W− phase winding 41f are wound on the teeth 31b in the same direction. The U+ phase winding 41a and the U− phase winding 41b on the teeth 31b that are located at positions separated from each other by 150 degrees in the circumferential direction. The V+ phase winding 41c and the V− phase winding 41d are wound on the teeth 31b that are located at positions separated from each other by 150 degrees in the circumferential direction. The W+ phase winding 41e and the W− phase winding 41f are wound on the teeth 31b that are located at positions separated from each other by 150 degrees in the circumferential direction.

The X+ phase winding 51a and the X− phase winding 51b are wound on the teeth 31b in the same direction. The Y+ phase winding 51c and the Y− phase winding 51d are wound on the teeth 31b in the same direction. The Z+ phase winding 51e and the Z− phase winding 51f are wound on the teeth 31b in the same direction. The X+ phase winding 51a and the X− phase winding 51b are wound on the teeth 31b that are located at positions separated from each other by 150 degrees in the circumferential direction. The Y+ phase winding 51c and the Y− phase winding 51d are wound on the teeth 31b that are located at positions separated from each other by 150 degrees in the circumferential direction. The Z+ phase winding 51e and the Z− phase winding 51f are wound on the teeth 31b that are located at positions separated from each other by 150 degrees in die circumferential direction.

The U+ phase winding 41a and the U− phase winding 41b are connected by a bridge wire (not shown). The V+ phase winding 41c and the V− phase winding 41d are connected by a bridge wire (not shown). The W+ phase winding 41e and the W− phase winding 41f are connected by a bridge wire (not shown). The X+ phase winding 51a and the X− phase winding 51b are connected by a bridge wire (not shown). The Y+ phase winding 51c and the Y− phase winding, 51d are connected by a bridge wire (not shown). The Z− phase winding 51e and the Z− phase winding 51f are connected by a bridge wire (not shown).

In the present embodiment, the first three-phase winding 40 is connected to the first inverter circuit by delta connection. The second three-phase winding 50 is connected to the second inverter circuit by delta connection. More specifically, the U+ phase winding 41a and the W− phase winding 41f, which are located adjacent to each other, have terminal wires 33a that are connected to an electrically identical terminal of the first inverter circuit. The U phase winding 41b and the V+ phase winding 41c have terminal wires 33a that are connected to an electrically identical terminal of the first inverter circuit. The W+ phase winding 41e and the V− phase winding 41d have terminal wires 33a that are connected to an electrically identical terminal of the first inverter circuit.

The X− phase winding 51b and the Z+ phase winding 51e have terminal wires 33a that are connected to an electrically identical terminal of the second inverter circuit. The Y− phase winding 51d and the X+ phase winding 51a have terminal wires 33a that are connected to an electrically identical terminal of the second inverter circuit. The Z− phase winding 51f and the Y+ phase winding 51c have terminal wires 33a that are connected to an electrically identical terminal of the second inverter circuit.

As shown in FIG. 1, a guide member 60 is arranged on a portion of the stator 30 located closer to the hydraulic unit 11, that is, toward one side in the axial direction of the stator core 31.

The guide member 60 guides the terminal wires 33a of the stator coils 33 to the EDU 12 and includes guide body 61 and an outlet guide 81.

Figure 5:
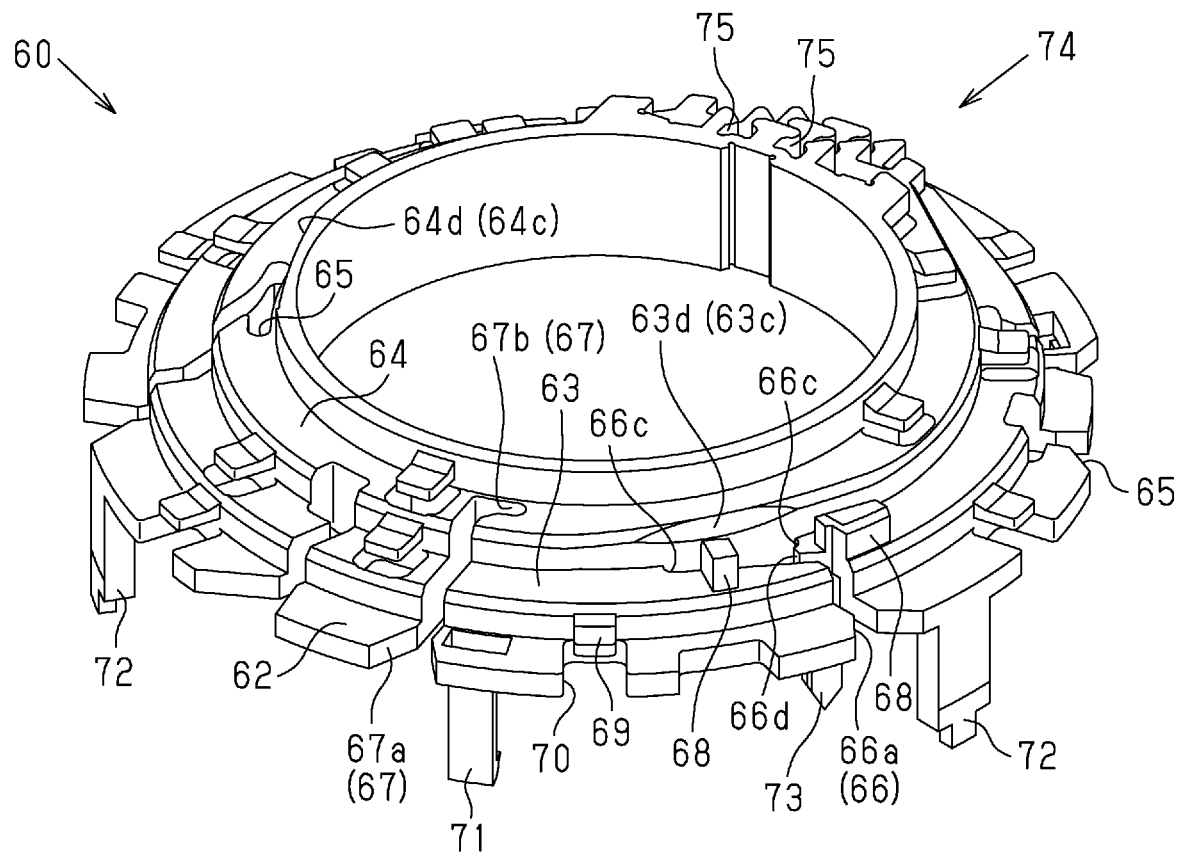
FIG. 5 is a perspective view of the guide member of the embodiment.
Figure 6:
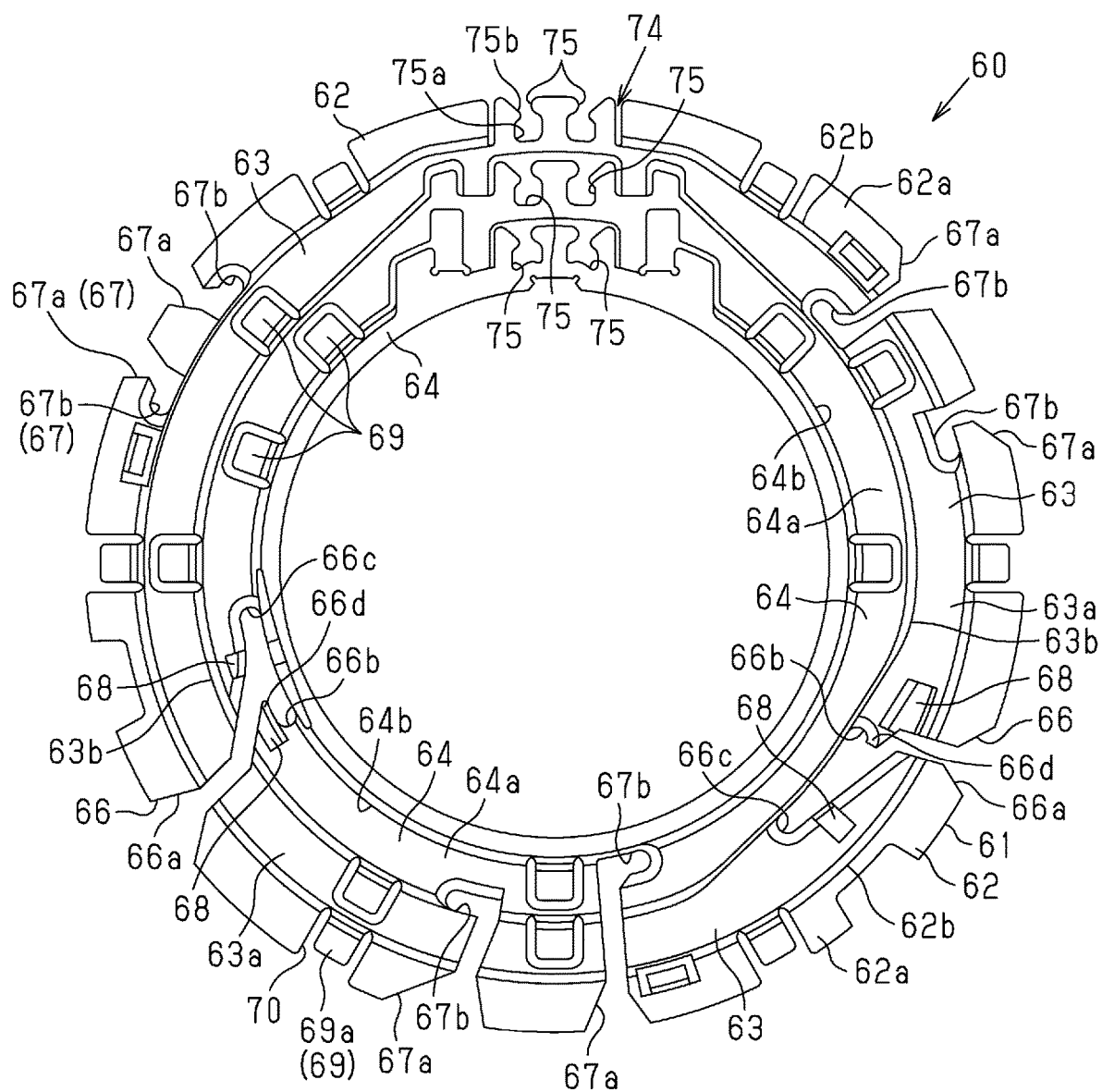
FIG. 6 is a plan view of the guide member of the embodiment.

As shown in FIGS. 5 and 6, the guide body 61 includes a lower step 62, an intermediate step 63, and an upper step 64 and has a three-step structure.

The lower step 62 includes a base 62a, which has a surface extending in the radial direction and directed in the axial direction, and a riser 62b, which has a surface extending from a radially inner side of the base 62a in the axial direction and directed in the radial direction.

The intermediate step 63 includes a base 63a, which has a surface extending in the radial direction and directed in the axial direction, and a riser 63b, which has a surface extending from a radially inner side of the base 63a in the axial direction and directed in the radial direction. The base 63a is configured to extend from an axial end of the riser 62b in the radial direction.

The upper step 64 includes a base 64a, which has a surface extending in the radial direction and directed in the axial direction, and a riser 64b, which has a surface extending from a radially inner side of the base 64a in the axial direction and directed in the radial direction. The base 64a is configured to extend from an axial end of the riser 63b in the radial direction.

When the guide body 61 is coupled to one side of the stator core 31 in the axial direction, the lower step 62 is located closer to the stator core 31 than the intermediate step 63 and the upper step 64 in the axial direction. The intermediate step 63 is located between the lower step 62 and the upper step 64. When the guide body 61 is coupled to one side of the stator core 31 in the axial direction, the upper step 64 and the stator core 31 are located at opposite sides of the lower step 62 and the intermediate step 63 in the axial direction. The lower step 62 is located at a radially outer side of the intermediate step 63 and the upper step 64. The upper step 64 is located at a radially inner side of the lower step 62 and the intermediate step 63. That is, the guide body 61 of the present embodiment is separated further from the stator core 31 in the axial direction in the order from the lower step 62, which is located at the radially outer side, and the diameter becomes smaller (that is, the diameter is decreased).

The guide body 61 includes slits 65 that guide the terminal wires 33a of the stator coils 33 from a radial outer side to a radially inner side. The slits 65 include first slits 66 and second slits 67. In the present embodiment, the guide body 61 includes two first slits 66 and six second slits 67.

Figure 7:
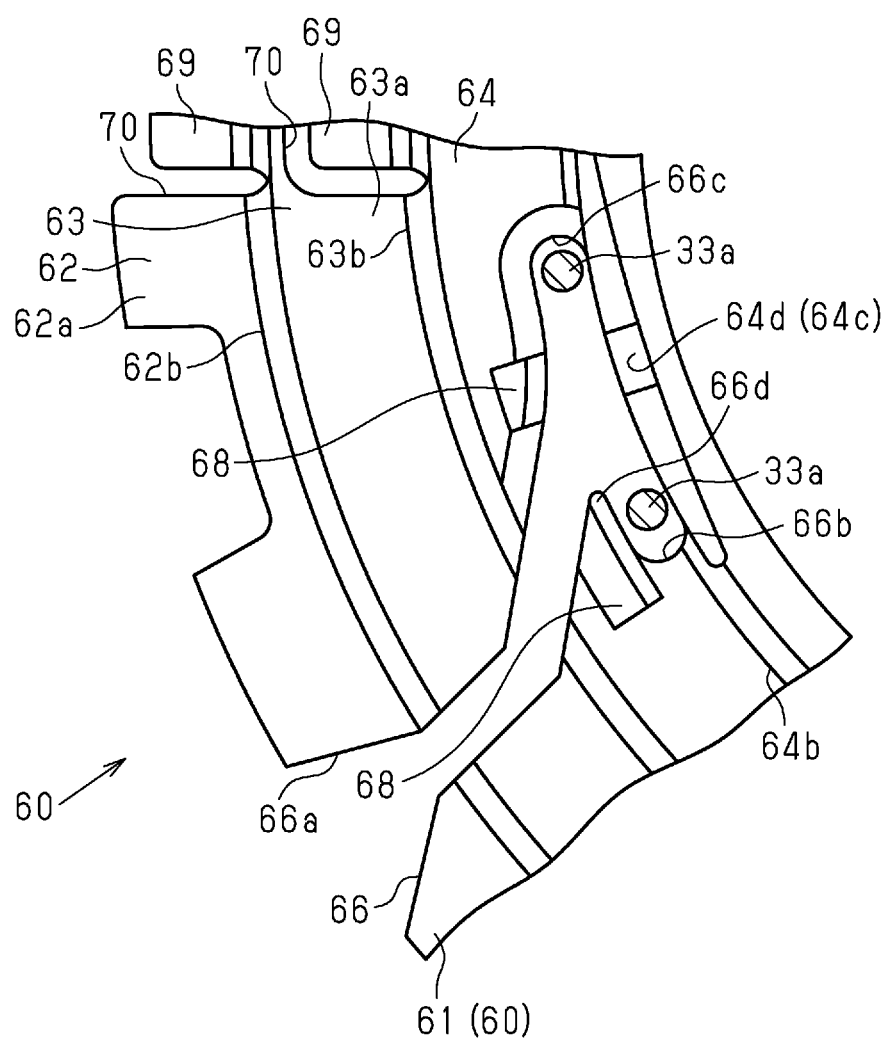
FIG. 7 is a plan view showing a portion of the guide member of the embodiment.

As shown in FIG. 7, the first slit 66 is configured to draw in two terminal wires 33a of the coils 33. The second slit 67 is configured to draw in one terminal wire 33a of the coil 33.

Figure 11:
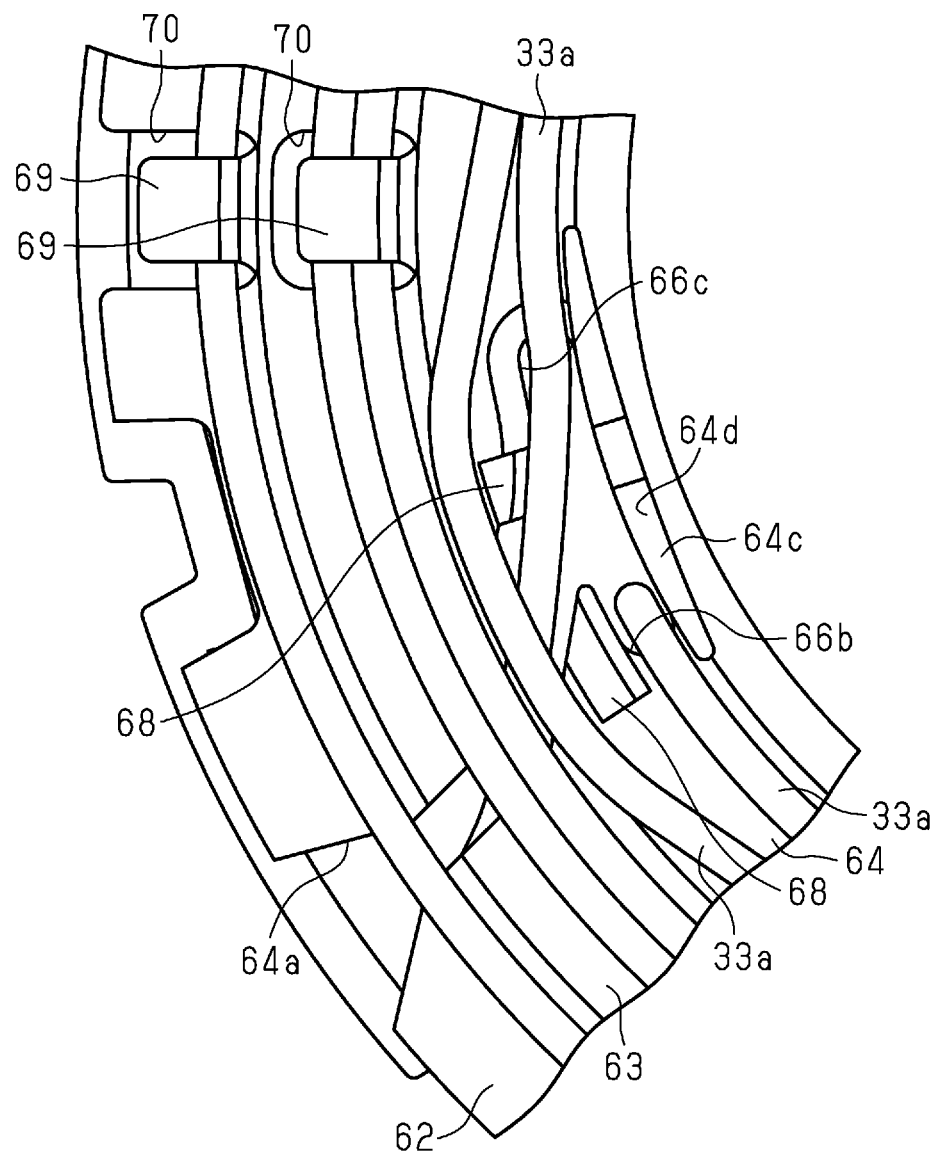
FIG. 11 is a plan view showing a portion of the stator in the embodiment.

As shown in FIG. 11, each of the first slits 66 includes a guide 66a, which is cut away in the radial direction, and two holders 66b and 66c, which are in communication with the guide 66a and hold the terminal wires 33a of the coils 33.

The guide 66a, which corresponds to a radial slit portion, extends in the base 62a of the lower step 62 wider in a radially outward direction. Thus, the terminal wires 33a of the coils 33 are easily guided.

The holder 66b, which corresponds to a circumferential slit portion, is in communication with the guide 66a at a radially inner side of the guide 66a and is cut away toward a first side in the circumferential direction. The holder 66c, which corresponds to a circumferential slit portion, is in communication with the guide 66a at a radially inner side of the guide 66a and is cut away toward a second side in the circumferential direction. That is, the holder 66b and the holder 66c are cut away to opposite sides in the circumferential direction.

The holder 66b includes a circumferential projection 66d, which corresponds to a restriction. The circumferential projection 66d is located at a radially outer side of the holder 66b and extends in the circumferential direction. The circumferential projection 66d limits interference of the terminal wire 33a arranged on the holder 66b with a terminal wire 33a that is later drawn in and mistakenly arranged on the holder 66c.

Each of the second slits 67 includes a guide 67a, which is cut away in the radial direction, and a holder 67b, which is in communication with the guide 67a and holds the terminal wire 33a of the coil 33.

In the same manner as in the first slits 66, the guide 67a, which corresponds to a radial slit portion, extends in the base 62a of the lower step 62 wider in a radially outward direction. Thus, the terminal wires 33a of the stator coils 33 are easily guided.

The holder 67b, which corresponds to a circumferential slit portion, is in communication with the guide 67a at a radially inner side of the guide 67a and is cut away toward the first side or the second side in the circumferential direction.

Separators 68 extend in the axial direction in the vicinity of the first slits 66 of the steps 62, 63, and 64 where the terminal wires 33a of different phases are prone to interfere with each other. In the present example, the intermediate step 63 and the upper step 64 include the separators 68. The separators 68 are located, at a radially outer side of the risers 63b and 64b so that the separators 68 are spaced apart from the respective risers 63b and 64b by a gap corresponding to the diameter of the terminal wire 33a. The terminal wire 33a that is located at a radially inner side (inner portion) of the separators 68 is first inserted into the gap and drawn in the circumferential direction. Thereafter, another terminal wire 33a that is located at a radially outer side (outer portion) of the separators 68 is drawn in the circumferential direction.

Portions of the intermediate step 63 and the upper step 64 where the first slits 66 are arranged respectively include corners 63c and 64c at a radially inner side of the first slits 66. The corners 63c and 64c include chamfered portions 63d and 64d. When the terminal wire 33a is drawn in the circumferential direction along the first slit 66, tension may be applied to the terminal wire 33a so that a portion of the terminal wire 33a extending out of the first slit 66 is located toward a further radially inner side of the radially inner end of the first slit 66. In this case, if the corners are, for example, orthogonal, the terminal wire 33a bends from the corner and tends to separate from the riser, which is the radially opposing surface of the step. In this state, if the terminal wire 33a is drawn in the circumferential direction, the position of the terminal wire 33a that is in contact with the first slit 66 tends to be displaced radially outward. In this regard, as described above, the chamfered portion 64d includes the corner 64c to limit the bending at the corner 64c. Thus, the radially outward displacement of the position contacting the slit is limited when the terminal wire 33a is drawn in the circumferential direction.

Figure 12:
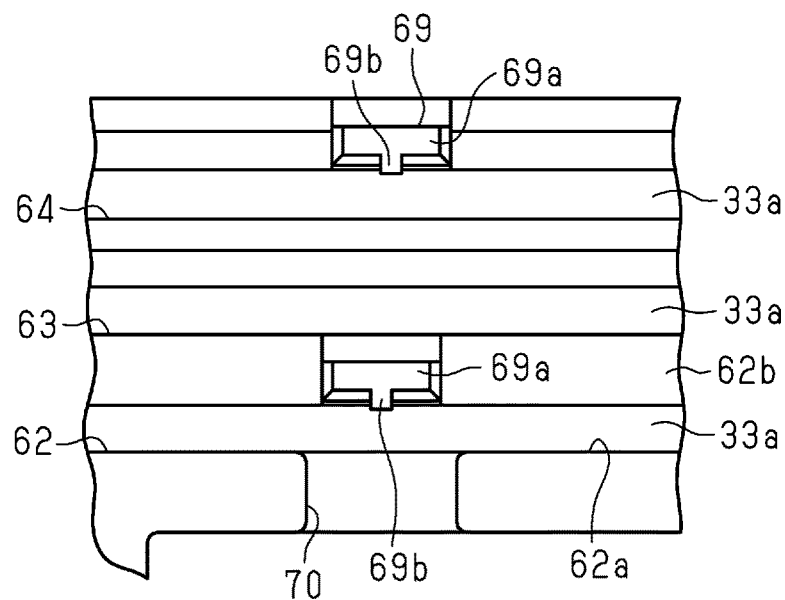
FIG. 12 is a side view showing a portion of the stator in the embodiment.
Figure 13:
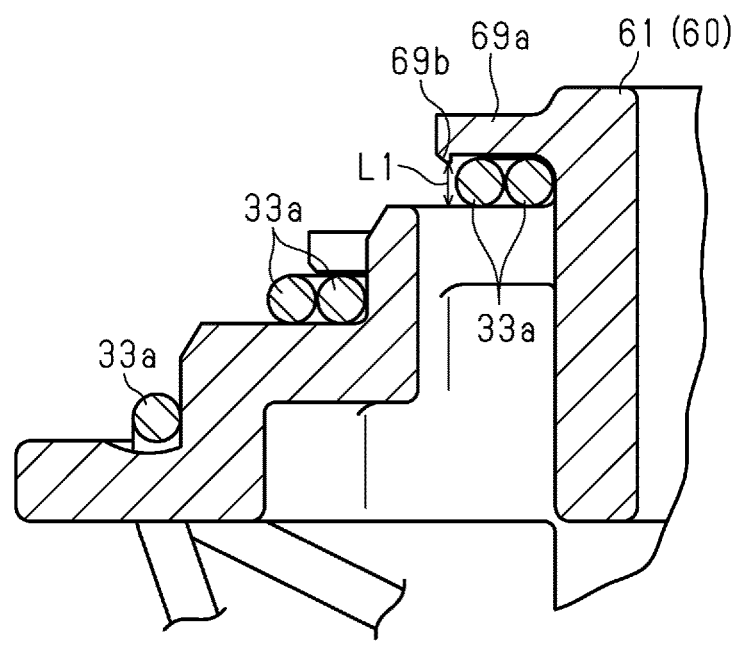
FIG. 13 is a cross-sectional view showing a portion of the guide member in the embodiment.

As shown in FIGS. 6, 12, and 13, the guide body 61 includes terminal wire restrictions 69 extending from each of the risers 62b, 63b, and 64b in die radial direction. In the present example, the risers 62b, 63b, and 64b each include five terminal wire restrictions 69. Each of the terminal wire restrictions 69 includes an extension 69a extending from the corresponding one of the risers 62b, 63b, and 64b in the radial direction and a protrusion 69b extending from the distal side of the extension 69a in the axial direction as a barb. The axial distance L1 from the axial distal end of the protrusion 69b to the bases 62a, 63a, 64a of the steps 62, 63, and 64 is set to be less than the diameter of the terminal wire 33a to limit radial displacement of the terminal wires 33a.

The extensions 69a restrict axial movement of the terminal wires 33a of the stator coils 33 that are drawn around the bases 62a, 63a, and 64a. The protrusions 69b restrict radial movement of the terminal wires 33a of the stator coils 33 that are drawn around the bases 62a, 63a, and 64a. Such restriction on radial and axial movements of the terminal wires 33a limits vibration of the terminal wires 33a. Additionally, the restriction on radial movement of the terminal wires 33a limits interference with a layout operation of another terminal wire when the terminal wire is drawn in the circumferential direction. Thus, the layout is easily performed.

Portions of the bases 62a, 63a, and 64a opposed to the terminal wire restrictions 69 in the axial direction are cut away defining cutaway portions 70. This allows the terminal wires 33a to be temporarily bent toward the cutaway portions 70. For example, in a configuration that does not allow the terminal wires 33a to be temporarily bent toward the cutaway portions 70, if the terminal wire restrictions 69 have the same configuration as the present embodiment, it is difficult for the terminal wires 33a to enter between the bases 62a, 63a, and 64a and the terminal wire restrictions 69. In this case, the position of the terminal wire restrictions 69 may need to be shifted upward. However, in the configuration of the present embodiment, portions of the bases 62a, 63a, and 64a opposed to the terminal wire restrictions 69 in the axial direction are cut away defining the cutaway portions 70. This eliminates the need for upward shifting of the position of the terminal wire restrictions 69, thereby narrowing the clearance between the terminal wire restrictions 69 and the terminal wires 33a as compared to a configuration that does not include the cutaway portions 70. Thus, the terminal wires 33a are stably held between the terminal wire restrictions 69 and portions of the bases 62a, 63a, and 64a extending around the cutaway portions 70.

As shown in FIGS. 3 to 5, the guide member 60 includes attachment pieces 71 extending downward from the lower surface of the base 62a of the lower step 62. The attachment pieces 71 are attached to the insulator 32 of the stator core 31. The attachment pieces 71 and the insulator 32 have snap-fit structures and engage with each other in the axial direction. This limits separation of the guide member 60 from the stator core 31 (insulator 32).

As shown in FIGS. 3 to 5, the guide member 60 includes legs 72 extending downward from the lower surface of the base 62a of the lower step 62. When the guide member 60 is coupled to the stator core 31 (insulator 32), the legs 72 are in contact with the stator core 31 in the axial direction. When the legs 72 are in contact with the stator core 31 and the attachment pieces 71 are engaged with the insulator 32 in the axial direction by the snap-fit structure, the guide member 60 is fixed in a fixed range in the axial direction. This allows axial movement of the guide member 60 relative to the stator core 31 (insulator 32) in the predetermined range, that is, allows a backlash.

Figure 8:
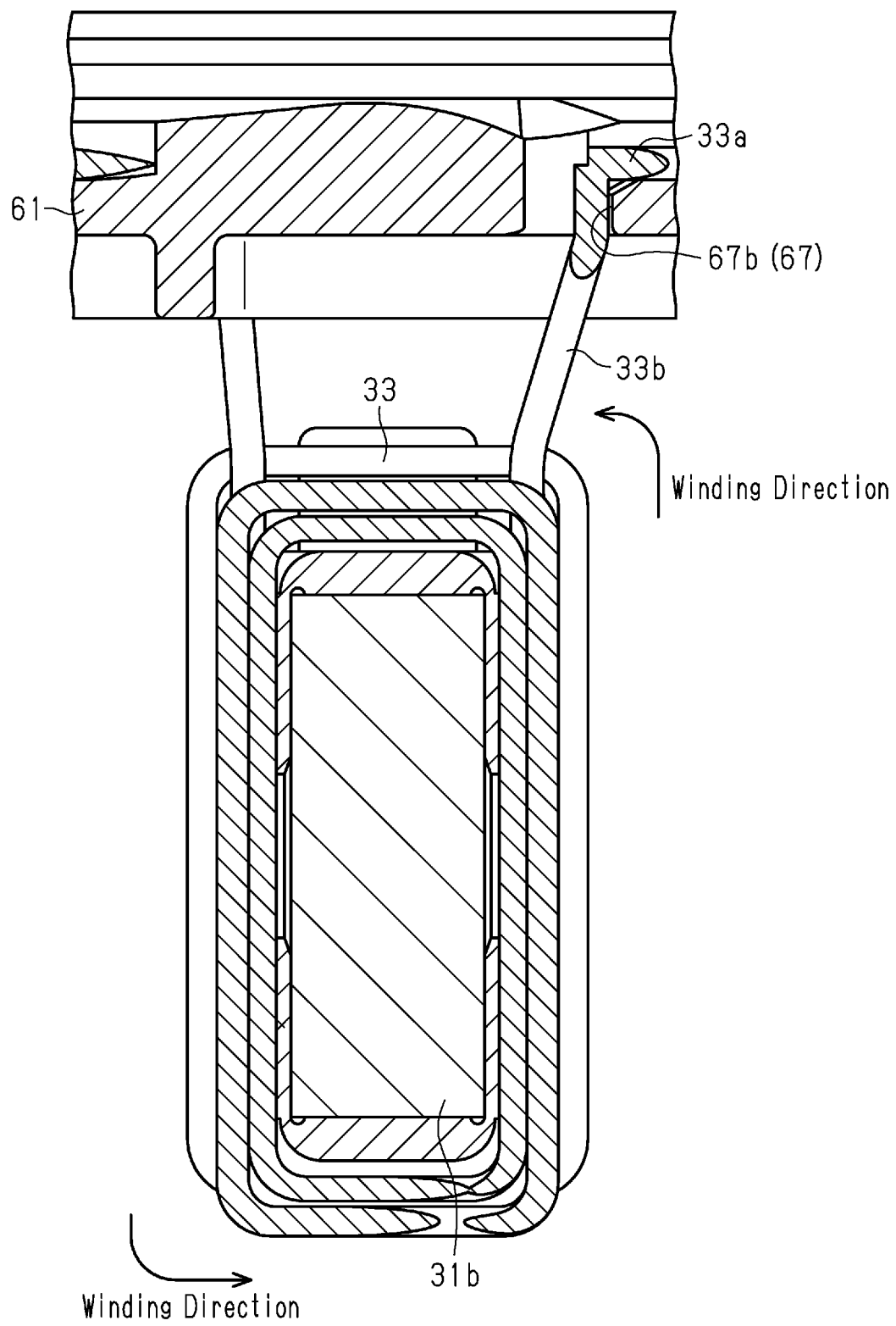
FIG. 8 is a cross-sectional view of the stator of the first embodiment.
Figure 9:
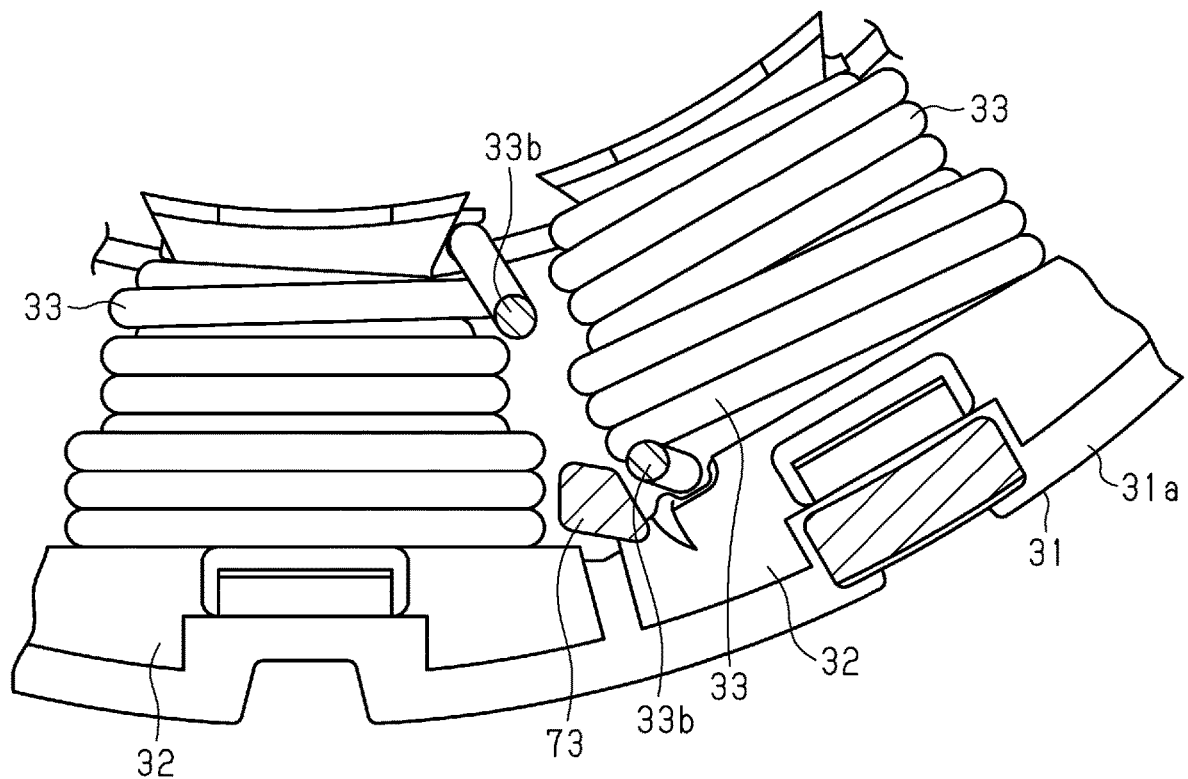
FIG. 9 is a plan view showing a portion of the stator of the embodiment.

As shown in FIGS. 3 and 9, the guide member 60 includes protrudent restrictions 73 extending toward the stator core 31 in the axial direction. The restrictions 73 extend from the lower surface of the base 62a of the lower step 62 toward the stator core 31. When the guide, member 60 is coupled to the stator core 31, the restrictions 73, the insulator 32, and the coil 33 surround an axial extension 33b of the coil 33. This restricts movement of the axial extension 33b. Each of restrictions 73 has an axial distal end located between circumferentially adjacent ones of the coils. The axial distal end is tapered as shown in FIG. 5 along the inclination (refer to FIG. 8) of the axial extension 33b.

As shown in FIG. 8, when the drawing direction in which the coil 33 (terminal wire 33a) is, drawn in the circumferential direction conforms to a direction that loosens the winding of the coil 33 (terminal wire 33a) on the stator core 31 the holder 67b which is the circumferential end of the slit 67 at a radially inner side, is arranged on the axial extension 33b. This restricts movement of the holder 67b in the direction loosening the winding of the coil even when the terminal wire 33a is drawn in the circumferential direction.

Each of the steps 62, 63, and 64 of the guide body 61 includes a collector 74 that collects the terminal wires 33a that are drawn around the steps 62, 63, and 64.

Figure 10:
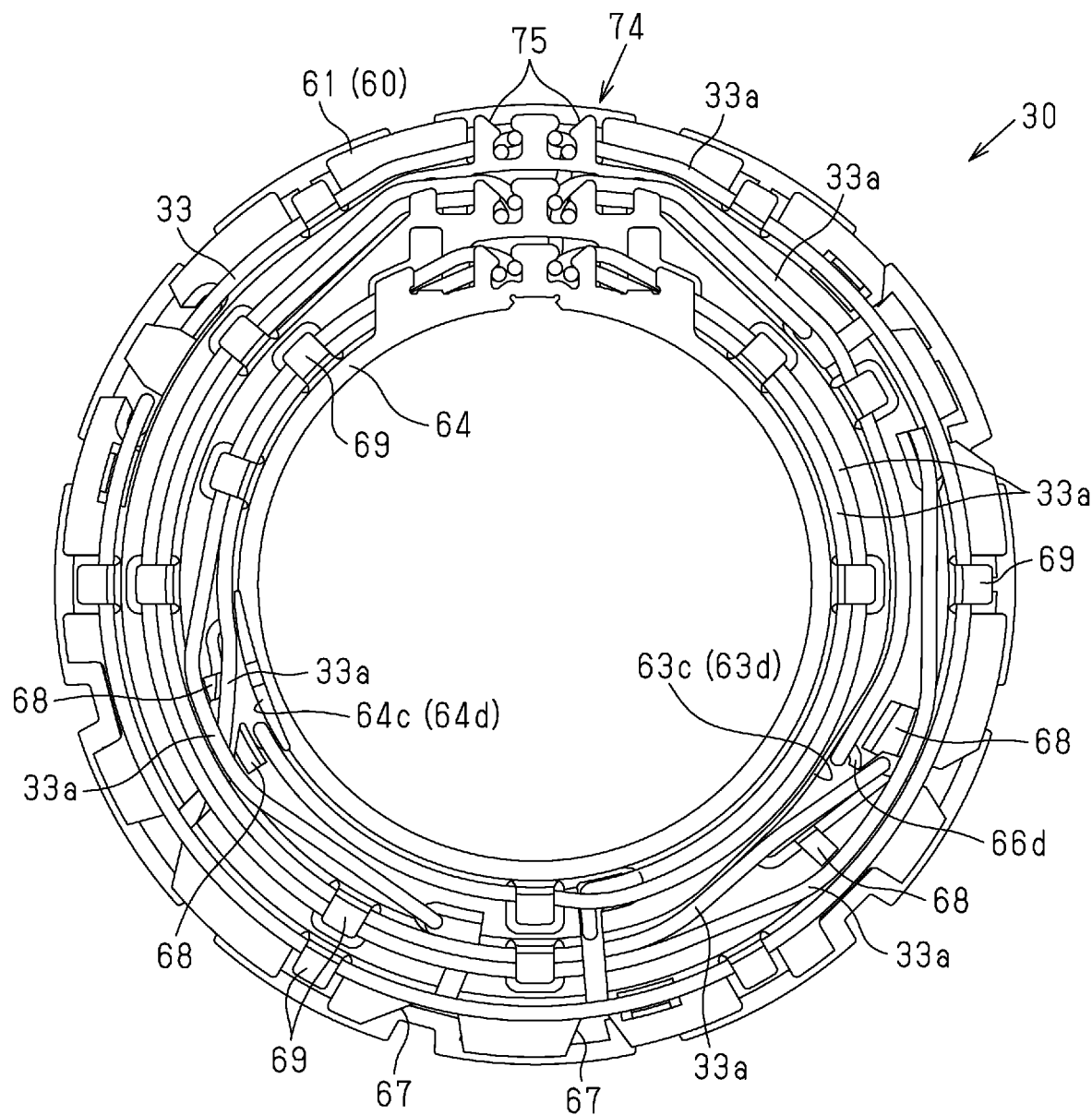
FIG. 10 is a plan view of the stator in the embodiment.
Figure 14:
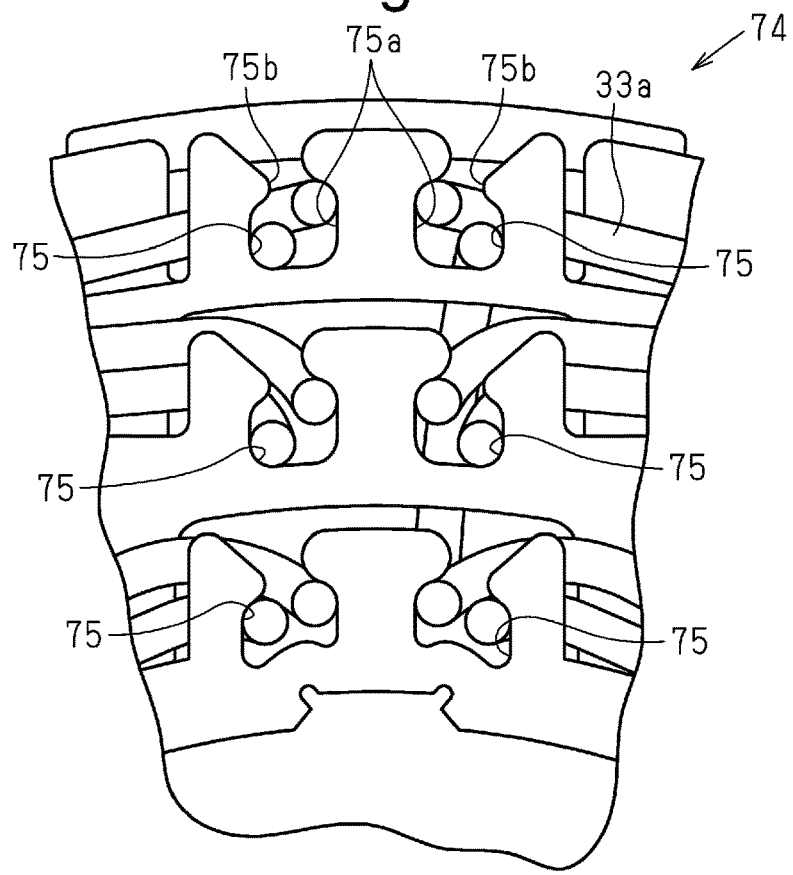
FIG. 14 is a plan view showing a portion of the stator in the embodiment.

As shown in FIGS. 6, 10, and 14, the collector 74 includes loose-fit portions 75. In the present example, two loose-fit portions 75 are provided on each of the steps 62, 63, and 64. Six loose-fit portions 75 are provided in total.

As shown in FIGS. 6, 10, and 14, the loose-fit portions 75 extend radially outward from the risers 62b, 63b, and 64b, each of which has a surface directed in the radially outward direction.

Each of the loose-fit portions 75 includes a retainer 75a and entrances 75b. The retainer 75a has an opening that is greater than the terminal wire 33a and is open in the axial direction. In one example, the retainer 75a has an open width that is more than two times greater than the diameter of the terminal wire 33a. In one example, the retainer 75a has an open area that is more than two times greater than a cross-sectional area of the terminal wire 33a. The entrances 75b are located at a radially outer side of the retainer 75a and have an opening that is smaller than the diameter of the terminal wire 33a and open in the radial direction. The entrances 75b allow entrance of the terminal wires 33a from a radially outer side of the retainer 75a. When the terminal wire 33a passes through the entrance 75b, the terminal wire 33a deforms or the entrance 75b deforms so that the terminal wire 33a enters the retainer 75a. Even when the retainer 75a retains two terminal wires 33a, the terminal wires 33a are loosely fitted to the retainer 75a. This limits excessive tension and damage to the terminal wires 33a.

Figure 15:
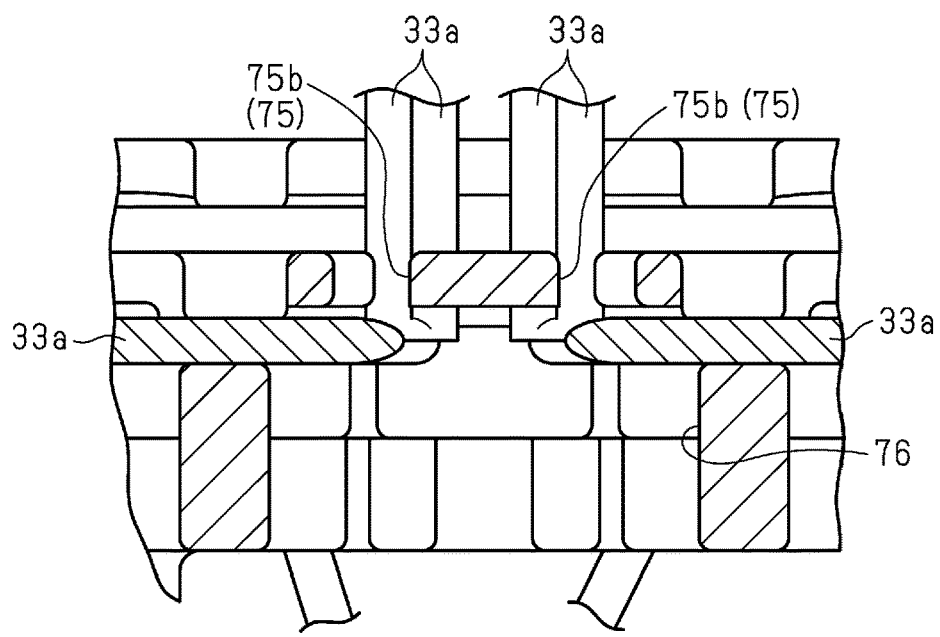
FIG. 15 is a cross-sectional view showing a portion of the stator in the embodiment.

As shown in FIG. 15, the loose-fit portion 75 has a bottom portion including a cutaway portion 70 at a side opposite to the side (upper side) to which the terminal wire 33a extends out of the loose-fit portion 75 in the axial direction. Thus, when the terminal wire 33a upwardly extends out in the axial direction, the terminal wire 33a is allowed to bend toward the cutaway portion 76. Thus, the terminal wire 33a is upwardly drawn from the loose-fit portion 75 in the axial direction.

Figure 16D:
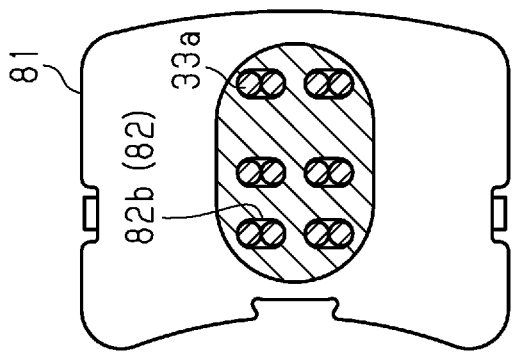
FIGS. 16A to 16D are cross-sectional views showing an outlet, guide of the guide member in the embodiment.
Figure 16C:
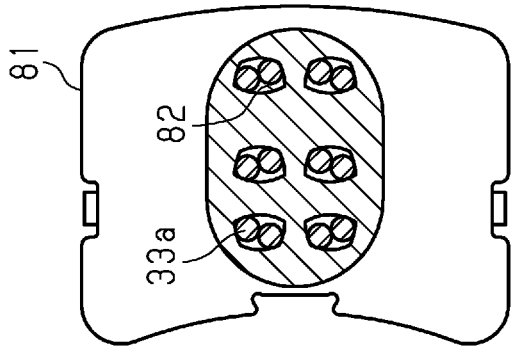
Figure 16B:
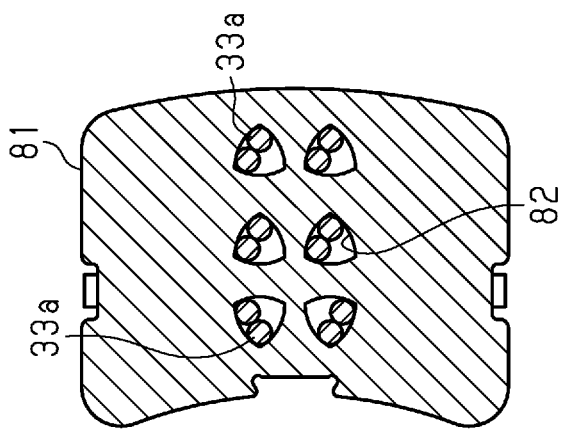
Figure 16A:
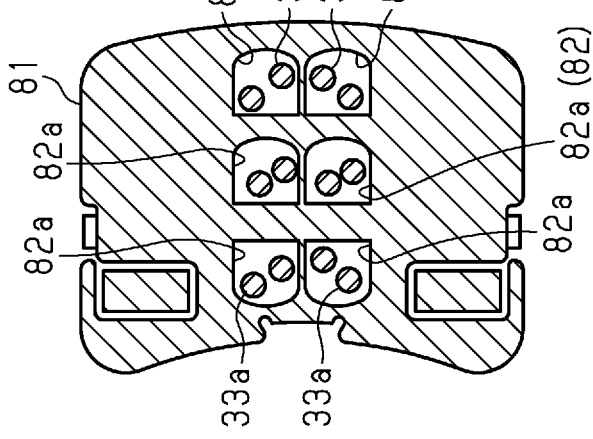
Figure 17:
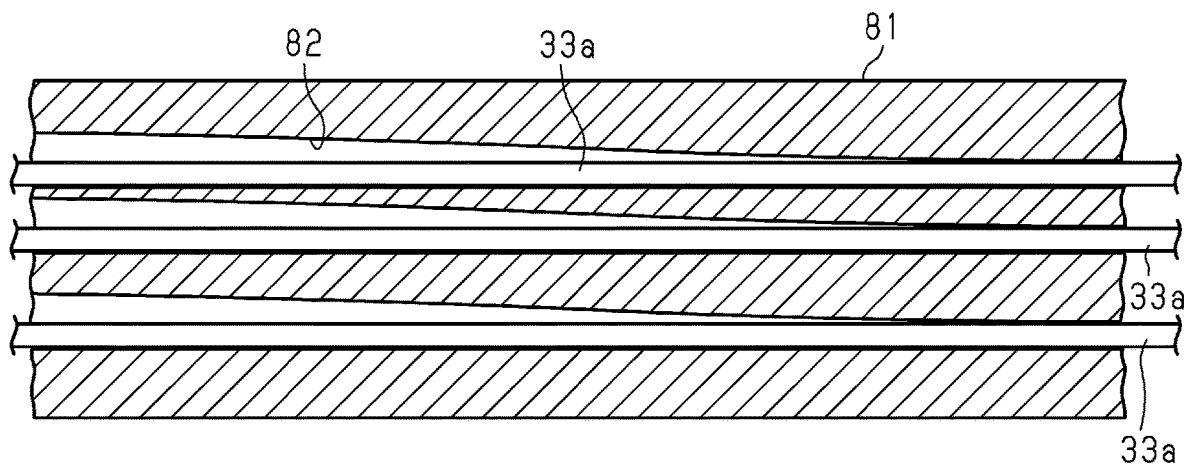
FIG. 17 is a cross-sectional view showing the outlet guide of the guide member in the embodiment.

As shown in FIGS. 16A to 17, the outlet guide 81 is rod-shaped and elongated in the axial direction. The outlet guide 81 includes six insertion holes 82 corresponding to the six loose-fit portions 75 when coupled to the guide body 61.

When the outlet guide 81 is coupled to the guide body 61, the insertion holes 82 are opposed to the respective loose-fit portions 75 in the axial direction. The insertion holes 82 extend in the longitudinal direction of the outlet guide 81 (i.e., axial direction).

The outlet guide 81 is formed from, for example, an insulation material such as resin. Thus, the terminal wire 33a inserted through one of die insertion holes 82 in the outlet guide 81 is insulated from another terminal wire 33a inserted through another one of the insertion holes 82. Also, the terminal wires 33a inserted through the insertion holes 82 are insulated from the casing 11a of the hydraulic unit 11.

As shown in FIGS. 16A to 17, each of the insertion holes 82 includes an inlet 82a located toward the stator core 31 and an outlet 82b located at a side opposite to the stator core 31. The inlet 82a has a greater open area than the outlet 82b. The insertion hole 82 has an open area that gradually decreases from the side of die inlet 82a to the side of the outlet 82b. The wall surface of the insertion hole 82 is curved.

As shown in FIG. 16A, the insertion holes 82 are tetragonal at positions close to the inlets 82a. As shown in FIG. 16D, the insertion holes 82 are elliptical at positions close to the outlets 82b. As shown in FIG. 16B, the insertion holes 82 generally have die form of a triangle having a curve of constant width at intermediate positions between the inlets 82a and the outlets 82b. Such a construction allows the insertion holes 82 to guide the terminal wires 33a so that the terminal wires 33a inserted in the insertion holes 82 are arranged in a predetermined direction. Additionally, when the insertion holes 82 have the form of a triangle having a curve of constant width (i.e., Reuleaux triangle) in an intermediate position, the width may correspond to, for example, the diameter of two terminal wires 33a. This allows for movement of the two terminal wires 33a in the position and adjustment of positions of the terminal wires 33a. That is, the insertion holes 82 include a guide portion that guides the terminal wires 33a so that the terminal wires 33a are arranged in a predetermined arrangement in the outlets 82b.

The open area of the insertion holes 82 at positions close to the inlets 82a is sufficiently greater than each terminal wire 33a. Thus, the terminal wire 33a is in a none fixed state. As the non-fixed portion of the terminal wire 33a becomes longer, the resonance frequency lowers. When the insertion holes 82 have a constant open area in a predetermined range from the outlets 82b, the resonance frequency may increase.

Figure 18:
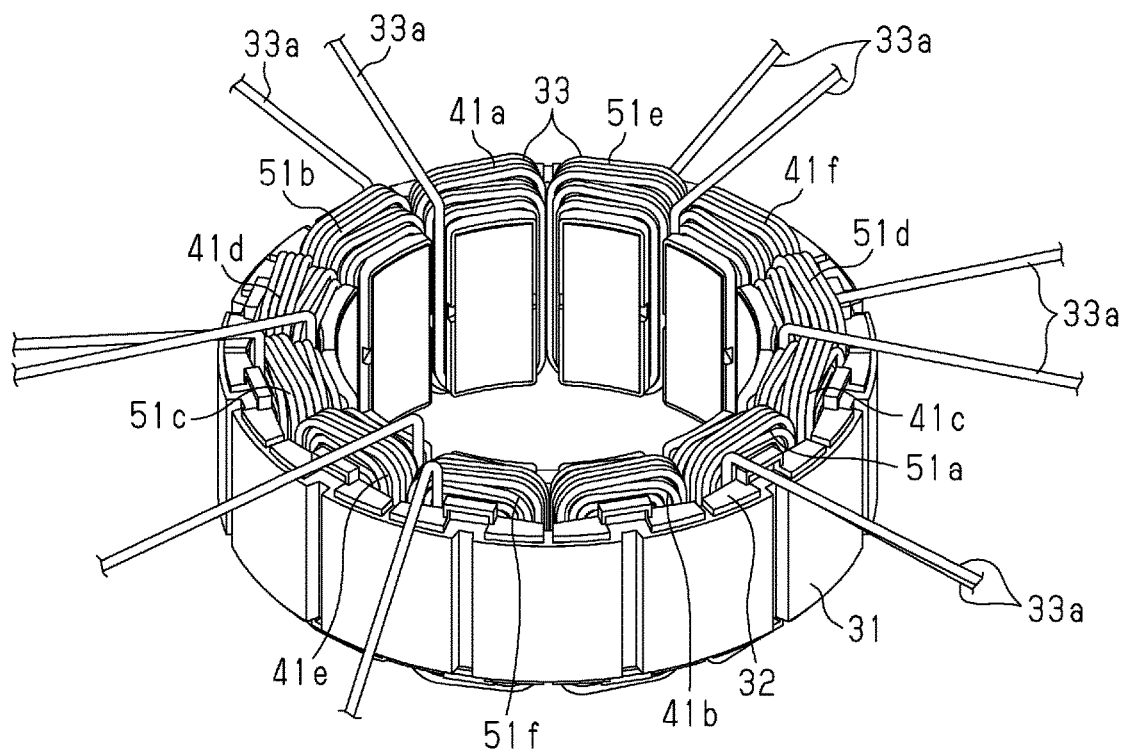
FIG. 18 is a diagram showing a method for manufacturing the stator in the embodiment.

A method for manufacturing the stator of the present embodiment will now be described, As shown in FIG. 18, the coils 33 are wound on the teeth 31b of the stator core 31.

Then, as shown in FIG. 18, the terminal wires 33a of the coils 33, which are wound on the teeth 31b of the stator core 31, extend out in the axial direction and bend in the radial direction (bending step).

Figure 19:
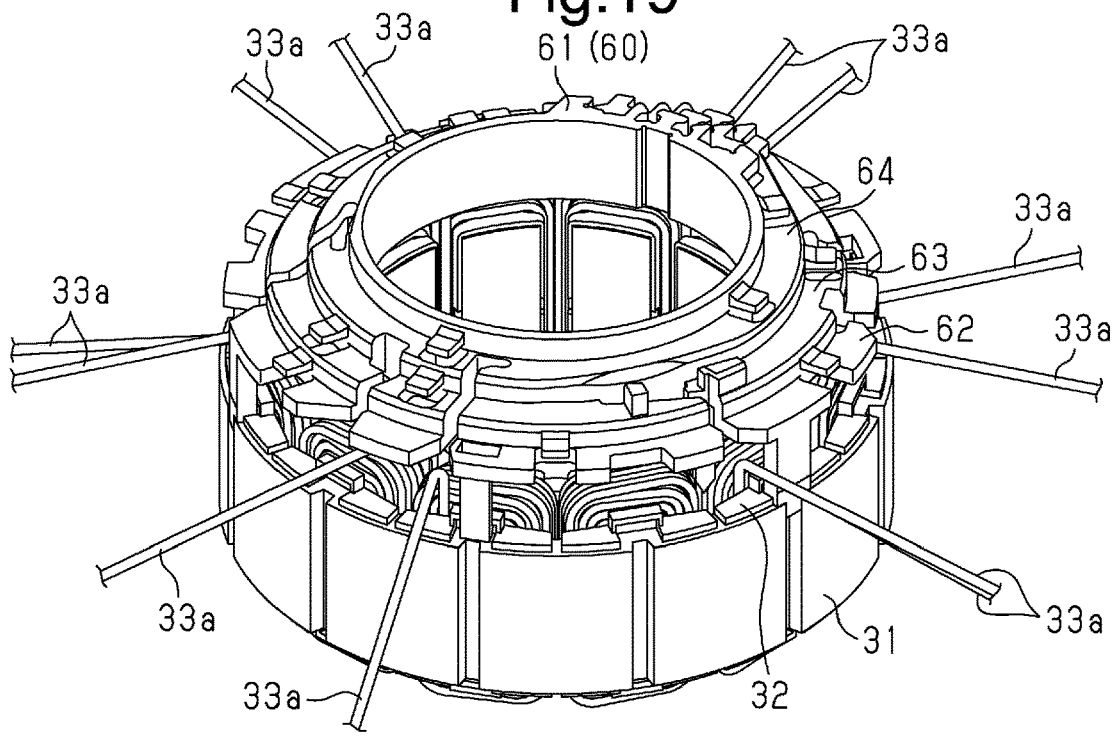
FIG. 19 is a diagram showing a method for manufacturing the stator in the embodiment.

As shown in FIG. 19, the guide body 61 of the guide member 60 is coupled to an axial side (upper side) of the stator core 31 (coupling step). At this time, since each terminal wire 33a is bent in the radial direction in the bending step, interference of the guide member 60 with the terminal wire 33a is limited.

Figure 20:
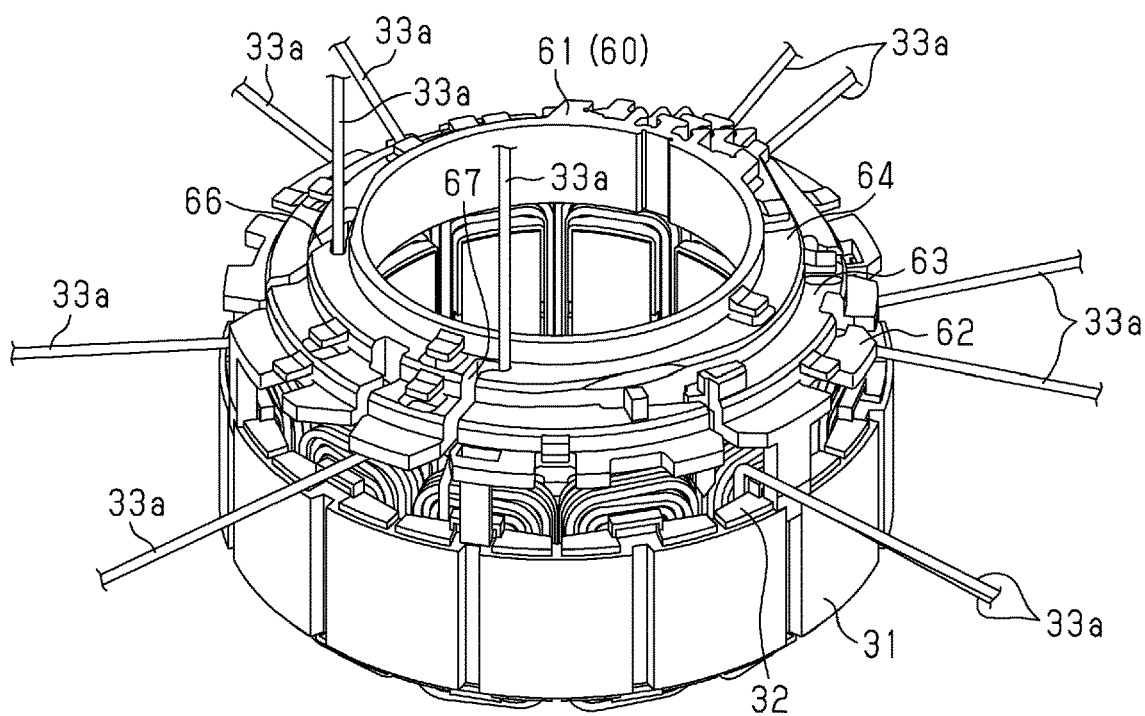
FIG. 20 is a diagram showing a method for manufacturing the stator in the embodiment.

As shown in FIG. 20, the terminal wires 33a are drawn into the respective slits 66 and 67. At this time, the terminal wires 33a of the phase windings connected to the same terminal are drawn into the respective slits 66 and 67.

Figure 21:
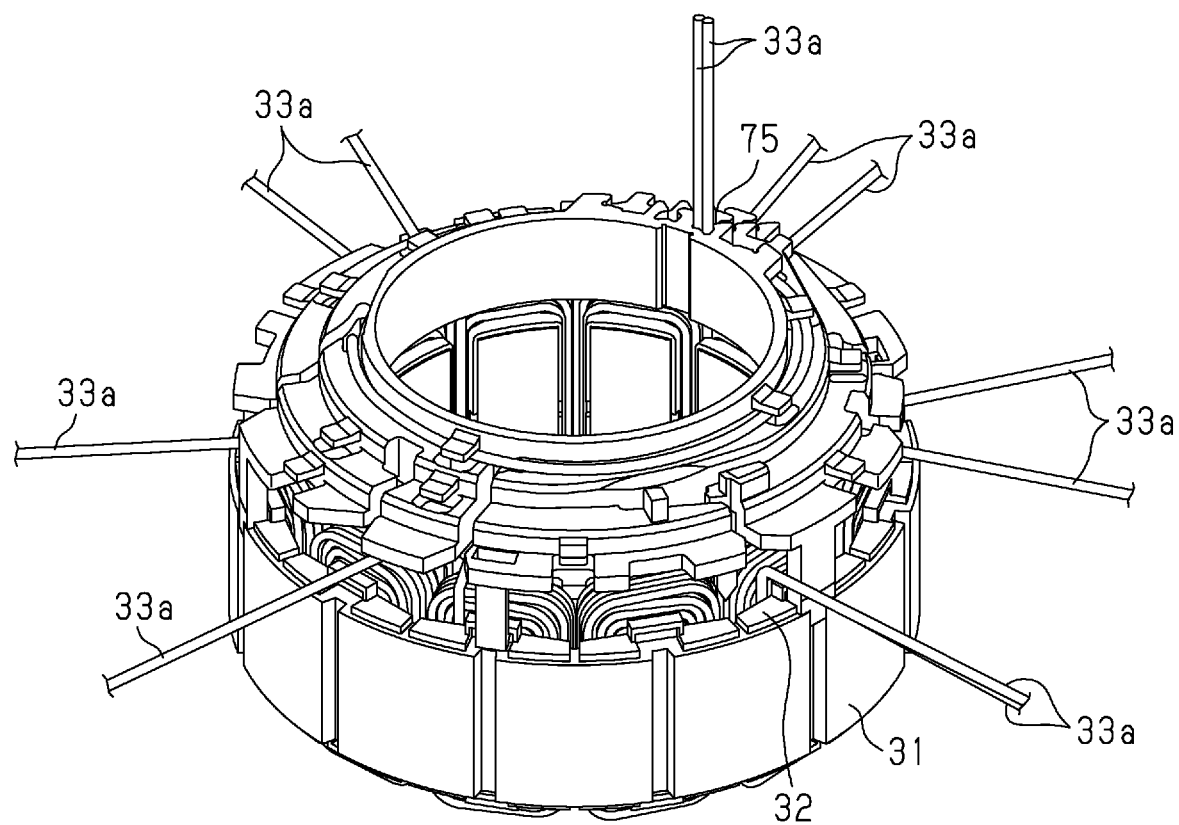
FIG. 21 is a diagram showing a method for manufacturing the stator in the embodiment.

As shown in FIG. 21, the terminal wires 33a of the multiphase coils 33 that are drawn toward the same side in the circumferential direction are laid out on the upper step 64 of the guide member 60 (layout step). Each of the terminal wires 33a is retained by the loose-fit portion 75 and extends out of the loose-fit portion 75 in the axial direction (extending step). The layout step and the extending step are repeated for each terminal wire 33a. In the present example, the layout step is repeatedly performed on terminal wires 33a in the order from the one that is to be laid out on the radially inner side (upper step 64).

Thereafter, when the terminal wires 33a retained by the loose-fit portions 75 are inserted through the insertion holes 82 in the outlet guide 81, the outlet guide 81 is inserted into the through hole 11b in the casing 11a of the hydraulic unit 11. The terminal wires 33a are electrically connected to the respective inverter circuits formed on the circuit board 90 in the EDU 12.

The present embodiment has the advantages described below.

(1) In the outlet guide 81, the inlet 82a has a larger open area than the outlet 82b. Thus, the terminal wires 33a of the coils 33 are easily inserted.

(2) The insertion hole 82 is configured to have an open area that gradually changes from the inlet 82a to the outlet 82b. Thus, die terminal wires 33a of the coils 33 are easily inserted.

(3) The wall surface of the insertion hole 82 includes an arcuate surface (has the shape of a curved surface). Thus, the terminal wires 33a having a circular cross section are easily inserted.

(4) Two or more of the terminal wires 33a of the coils 33 are inserted into each insertion hole 82, and the inserted terminal wires 33a of the coils 33 are guided to be arranged in a predetermined arrangement in the outlet 82b. This determines the arrangement of the terminal wires 33a and allows the terminal wires 33a to be easily connected to the circuit board 90.

(5) The outlet guide 81 is configured to extend through the hydraulic unit 11 located between the circuit board 90 and the stator 30. This allows the terminal wires 33a of the coils 33 to be connected to the circuit board 90.

The above-described embodiment may be modified as follows. The embodiment and modified examples described below may be combined with each other as long as there is no technical contradiction.

In the embodiment, die guide body 61 of the guide member 60 includes the lower step 62, the intermediate step 63, and the upper step 64 and has a three-step structure. Instead, for example, the guide body may have the shape of two steps. Such a structure allows for reduction in the size of the guide body.

In the embodiment, the wall surface of the insertion holes 82 includes an arcuate surface (has the shape of a curved surface). However, the wall surface may have a different shape.

In the embodiment, the insertion hole 82 is configured to guide the arrangement of the terminal wires 33a in the outlet 82b. However, a configuration that does not guide the arrangement may be used.

In the embodiment, the holder 66b includes the circumferential projection 66d. However, the circumferential projection 66d may be omitted.

In the embodiment, the holder 67b is arranged on the axial extension 33b. Instead, the holder 67b and the axial extension 33b may be arranged at different positions in the circumferential direction.

In the embodiment, the corners 63c and 64c include the chamfered portions 63d and 64d. However, the chamfered portions 63d and 64d may be omitted.

In the embodiment, the axial distal end of the restrictions 73 is tapered. Instead, the axial distal end of the restrictions 73 may have a fixed width.

In the embodiment, the axial extension 33b is surrounded by (held among) the restriction 73, the coil 33, and the insulator 32. Instead, for example, the axial extension 33b may be held between the restriction 73 and the coil 33. The axial extension 33b may be held between the restrictions 73 and the insulator 32.

In the embodiment, the first slit 66 includes the holders 66b and 66c that are cut away from a radially inner side of the guide 66a to opposite sides in the circumferential direction. Instead, one of the holders 66b and 66c may be omitted. More specifically, for example, the second slit 67 may be used instead of the first slit 66. When the second slit 67 is used instead of the first slit 66, two second slits 67 may be provided for one first slit 66 to have substantially the same function.

In the embodiment, the slits 67 arranged in the same one of the steps 62, 63, and 64 are separated from each other in the radial direction. Instead, the slits 67 arranged in the same one of the steps 62, 63, and 64 may be aligned with each other in the radial direction.

In the embodiment, the separators 68 are arranged at positions adjacent to the slits 65. However, such a configuration may be omitted.

In the embodiment, the slits 65 are configured to guide the coils 33 to the steps 62, 63, and 64 from a radially outer side toward a radially inner side. However, such a configuration can be omitted.

In the embodiment, the axial distance L1 between the protrusions 69b of the terminal wire, restrictions 69 and the bases 62a, 63a, and 64a is set to be smaller than the diameter of die coil 33 (i.e., terminal wire 33a). Instead, the axial distance L1 may be set to be, for example, substantially equal to the diameter of the coil 33.

In the embodiment, the cutaway portions 70 are arranged at portions opposed to the terminal wire restrictions 69 in the axial direction. However, the cutaway portions 70 may be omitted.

In the embodiment, the terminal wire restrictions 69 are provided. However, the terminal wire restrictions 69 may be omitted.

In the embodiment, different stator coils 33 are wound on each one of the teeth 31b, and the stator coils 33 are wound on the stator 30, for example, in the order of the U+ phase winding 41a, the W− phase winding 41f, the Z+ phase winding 51e, the Y− phase winding 51d, the V+ phase winding 41c, the U− phase winding 41b, the X+ phase winding 51a, the Z− phase winding 51f, the W+ phase winding 41e, the V− phase winding 41d, the Y+ phase winding 51c and the X− phase winding 51b. Instead, the stator coils 33 may be wound on the stator 30, for example, in the order of the U+ phase winding 41a, the Z+ phase winding 51e, the W− phase winding 41f, the Y− phase winding 51d, the V+ phase winding 41c, the X+ phase winding 51a, the U− phase winding 41b, the Z− phase winding 51f, the W+ phase winding 41e, the Y+ phase winding 51c, the V− phase winding 41d, and the X− phase winding 51b.

In the embodiment, the two inverter circuits, which correspond to two power supplies, are provided so that the configuration has redundancy. Instead, each of the phase windings 40 and 50 may be supplied with three-phase alternating current from a single inverter circuit to drive the motor.

In the embodiment, two terminal wires 33a are arranged on each of the loose-fit portions 75. Instead, for example, when the motor is driven by a single inverter circuit as described above, four terminal wires 33a may be arranged on one loose-fit portion 75.

In the embodiment, the layout step is repeatedly performed on the terminal wires 33a in the order front the one that is to be laid out on the radially inner side (upper step 64). Instead, the layout step may be repeatedly performed on the terminal wires 33a in the order from the one that is to be laid out on the radially outer side (lower step 62) or radially middle side (intermediate step 63).

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A motor comprising:
   a stator including a stator core and multiphase coils wound on the stator core;
   a rotor rotated by a rotational magnetic field generated in the stator; and
   a guide member arranged on an end of the stator core located at one side of the stator core in an axial direction to guide terminal wires of the multiphase coils wound on the stator core, wherein
   the guide member includes an outlet guide that draws the terminal wires out of the guide member toward a circuit board,
   the outlet guide includes insertion holes into which the terminal wires are inserted,
   the insertion holes each include an inlet and an outlet, the inlet being located toward the stator core and drawing into the outlet guide at least one of the terminal wires, and the outlet drawing out of the outlet guide the at least one of the terminal wires,
   the inlet has a first open area and the outlet has a second open area,
   the first open area being larger than the second open area,
   a cross sectional area of each of the insertion holes gradually changes from the inlet to the outlet, and
   the insertion holes are each tetragonal in cross section close to the inlet and elliptical in cross section close to the outlet.

2. The motor according to claim 1, wherein the insertion holes each are defined by a wall surface including an arcuate surface.

3. The motor according to claim 1, wherein
   two or more of the terminal wires are inserted into the each of the insertion holes,
   the insertion holes each include a guide portion that guides the terminal wires so that the terminal wires are arranged in a predetermined arrangement in the outlet.

4. The motor according to claim 1, wherein
   the insertion holes each generally have the form of a triangle in cross section having a curve of constant width at an intermediate position between the inlet and the outlet.

* * * * *